(12) United States Patent
Garthe

(10) Patent No.: US 10,119,303 B2
(45) Date of Patent: Nov. 6, 2018

(54) PADLOCK FOR SECURING AND MONITORING A SWITCH

(71) Applicant: ABUS August Bremicker Söhne KG, Wetter-Volmarstein (DE)

(72) Inventor: Bernhard Garthe, Gevelsberg (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 283 days.

(21) Appl. No.: 15/076,739

(22) Filed: Mar. 22, 2016

(65) Prior Publication Data

US 2016/0201358 A1 Jul. 14, 2016

Related U.S. Application Data

(63) Continuation of application No. 13/009,948, filed on Jan. 20, 2011.

(51) Int. Cl.
| | |
|---|---|
| *E05B 67/02* | (2006.01) |
| *G07C 9/00* | (2006.01) |
| *E05B 39/04* | (2006.01) |
| *F16P 3/08* | (2006.01) |
| *H01H 9/28* | (2006.01) |
| *E05B 67/24* | (2006.01) |

(52) U.S. Cl.
CPC .............. *E05B 67/02* (2013.01); *E05B 39/04* (2013.01); *F16P 3/08* (2013.01); *G07C 9/00309* (2013.01); *H01H 9/281* (2013.01); *E05B 67/24* (2013.01); *Y10T 70/413* (2015.04); *Y10T 70/446* (2015.04)

(58) Field of Classification Search
CPC .... E05B 65/001; E05B 65/0089; E05B 67/00; E05B 67/02; E05B 67/22; E05B 67/24
See application file for complete search history.

(56) References Cited

U.S. PATENT DOCUMENTS

| | | |
|---|---|---|
| 3,171,908 A | 3/1965 | Ladislav |
| 3,667,259 A | 6/1972 | Reque et al. |
| 3,993,987 A | 11/1976 | Stevens |
| 4,811,578 A | 3/1989 | Masoncup et al. |

(Continued)

FOREIGN PATENT DOCUMENTS

| | | |
|---|---|---|
| CN | 201588460 U | 9/2010 |
| DE | 199 50 145 C1 | 5/2001 |

(Continued)

OTHER PUBLICATIONS

International Search Report dated Apr. 25, 2015 reling to PCT/EP2012/000238

*Primary Examiner* — Christopher J Boswell
(74) *Attorney, Agent, or Firm* — Dinsmore & Shohl LLP

(57) ABSTRACT

A padlock for securing and monitoring a switch of an industrial plant has a lock housing of plastic, furthermore a hoop which is displaceably held at the lock housing and a lock cylinder which is arranged in the lock housing and can selectively be brought from an open position into a locked position to lock the hoop to the lock housing. An RFID transponder is arranged in the lock housing. A securing and monitoring system for a switch of an industrial plant includes at least one such padlock and a mobile RFID reading device or an RFID reading device permanently attached in the environment of the switch, said RFID reading device being configured to read out the RFID transponder of the padlock.

20 Claims, 4 Drawing Sheets

(56) References Cited

U.S. PATENT DOCUMENTS

| | | | |
|---|---|---|---|
| 5,365,757 A | 11/1994 | Primeau et al. | |
| 5,449,867 A | 9/1995 | Kelaita, Jr. et al. | |
| 5,755,121 A | 5/1998 | Crass | |
| 6,046,558 A | 4/2000 | Larson et al. | |
| 6,388,213 B1 | 5/2002 | Letient et al. | |
| 6,396,008 B1 | 5/2002 | Maloney et al. | |
| 6,761,051 B1* | 7/2004 | Tsai | E05B 47/0012 70/257 |
| 7,205,899 B2 | 4/2007 | Surkau | |
| 7,278,283 B2 | 10/2007 | Meckbach | |
| 7,334,443 B2* | 2/2008 | Meekma | E05B 47/063 307/10.2 |
| 7,434,426 B2* | 10/2008 | Loughlin | E05B 35/008 70/21 |
| 7,719,421 B2 | 5/2010 | Zovic | |
| 7,948,359 B2* | 5/2011 | Marcelle | G07C 9/00182 340/5.64 |
| 8,839,650 B2* | 9/2014 | Zuraski | B62H 5/003 70/21 |
| 8,850,858 B2* | 10/2014 | Nave | E05B 67/22 70/21 |
| 9,109,379 B1* | 8/2015 | Ranchod | E05B 67/00 |
| 9,121,199 B2* | 9/2015 | Li | E05B 47/06 |
| 9,194,159 B2* | 11/2015 | Garthe | E05B 67/18 |
| 9,322,196 B2* | 4/2016 | Garthe | E05B 67/24 |
| 9,495,820 B1* | 11/2016 | Li | E05B 67/00 |
| 9,672,672 B2* | 6/2017 | Ranchod | G07C 9/00182 |
| 9,890,561 B2* | 2/2018 | Perrenoud | E05B 39/002 |
| 2005/0199019 A1 | 9/2005 | Marcelle et al. | |
| 2005/0210932 A1 | 9/2005 | Azzalin et al. | |
| 2005/0236709 A1 | 10/2005 | Meekbach | |
| 2007/0171056 A1 | 7/2007 | Beyer | |
| 2008/0209956 A1 | 9/2008 | Araujo | |
| 2009/0282876 A1* | 11/2009 | Zuraski | E05B 67/003 70/35 |
| 2012/0186308 A1* | 7/2012 | Garthe | E05B 39/04 70/35 |
| 2014/0002239 A1* | 1/2014 | Rayner | G08B 13/1427 340/5.61 |
| 2014/0250954 A1* | 9/2014 | Buzhardt | E05B 39/04 70/20 |

FOREIGN PATENT DOCUMENTS

| | | |
|---|---|---|
| DE | 102006019142 A1 | 1/2007 |
| DE | 08 787 763 T | 9/2008 |
| EP | 0 996 105 | 9/1999 |
| EP | 1 808 879 A1 | 7/2007 |
| WO | 06/080863 A2 | 8/2006 |
| WO | 09/030816 | 3/2009 |
| WO | 09/036585 A1 | 3/2009 |

* cited by examiner

PADLOCK FOR SECURING AND MONITORING A SWITCH

CROSS-REFERENCE TO RELATED APPLICATIONS

This application is a continuation of U.S. patent application Ser. No. 13/009,948 filed Jan. 20, 2011.

FIELD OF THE INVENTION

The invention relates to a padlock for securing and monitoring a switch of an industrial plant. The invention further relates to a securing and monitoring system for a switch of an industrial plant which includes at least one padlock.

BACKGROUND OF THE INVENTION

A particular area of application of a padlock is in the field of occupational safety. There is the risk in connection with the servicing of industrial plants, for example, of a production machine, that the industrial plan deactivated for the purpose of service work is activated again by accident while the servicing work is still continuing. A substantial danger for the service engineer can result from this. It is therefore customary that the service engineer moves a switch associated with the industrial plant to an OFF position for the duration of the service work and secures it in this position, i.e. the switch is directly blocked or access to the switch is blocked. The named switch is typically an energy supply switch, for example a main electrical switch of a control device or of an energy supply device of the industrial plant (e.g. power switchbox). Alternatively to this, the named switch can, for example, be a valve of a liquid line or of a gas line.

In order effectively to avoid an accidental activation of the industrial plant by another person, each service engineer hangs a padlock on the named switch or on a blocking device associated with the switch before starting his work and locks said padlock. The switch is hereby secured in its OFF position, i.e. the switch cannot be moved accidentally back into an ON position by another person. When the service engineer has ended his work, he unlocks his padlock again and releases it from the switch. Each service engineer usually has his own individual padlock (or a plurality of his own individual padlocks) associated with him.

This procedure is also called locking out. The padlock used is accordingly called a lockout lock. The document U.S. Pat. No. 5,449,867 shows such a securing of an electric rocker switch by means of a padlock. It is known from the document U.S. Pat. No. 3,171,908 to secure the position of a rotary switch by means of a padlock.

So that a plurality of service engineers can block and release the switch again independently of one another, a plurality of receivers (e.g. eyelets) can be provided at the switch for hanging a plurality of lockout locks. This is known from the document U.S. Pat. No. 6,388,213, for example. If only a single receiver for a lockout lock is provided, a securing claw can be used which is hung into the respective eyelet of the switch or of the associated blocking device and which in turn has a plurality of hang-in eyelets for a respective padlock. Only when the last padlock has been removed from the securing claw can the securing claw be removed from the switch so that it can again be brought into the ON position. Such a securing claw for use at an electric switchbox is known, for example, from documents U.S. Pat. Nos. 6,396,008, 5,365,757 and 3,667,259.

It is known in connection with such a securing of a switch of an industrial plant to equip the lockout lock used with a housing of plastic, with a hoop being displaceably held at the lock housing and with a lock cylinder being arranged in the lock housing. The lock cylinder can selectively be brought from an open position into a locked position to lock the hoop to the lock housing after the hoop has, for example, been hung into an eyelet of the switch. By forming the lock housing from plastic, a particularly light padlock results which is of advantage in the use as a lockout lock since the service engineers occasionally carry a plurality of lockout locks simultaneously. A housing of plastic can also contribute to a desired electrical insulation. By the use of a plastic housing, there is furthermore a particularly simple possibility of color marking the padlock. The smaller stability of a plastic housing in comparison with a lock housing made of metal does not represent any serous disadvantage in a lockout lock since the padlock only serves the purpose of securing a switch against unintentional actuation, but not, for example, as theft protection. Such a lockout lock having a housing of plastic is known, for example, from documents U.S. Pat. Nos. 7,278,283 and 5,755,121. They are here cases of simple, purely mechanical padlocks.

SUMMARY OF THE INVENTION

It is an object of the invention to provide a padlock and a corresponding securing system which enable a reliable securing and monitoring of a switch of an industrial plant with a simple design.

This object is satisfied by a padlock having the features of claim 1 and in particular by a padlock for securing and monitoring a switch of an industrial plant having a lock housing made of plastic, furthermore having a hoop which is displaceably held at the lock housing and having a lock cylinder which is arranged in the lock housing and can selectively be brought from an open position into a locked position to lock the hoop to the lock housing, wherein an RFID transponder is also arranged in the lock housing.

It is possible to check and document in a simple manner by means of the RFID transponder arranged in the housing of the lockout lock, while using an associated reading device, whether the respective lockout lock is or was arranged at a switch of an industrial plant at a given time to secure the switch. For this purpose, the padlock used can have a simple mechanical design since the RFID transponder can be inserted into the padlock as a separate autonomous unit. The padlock can therefore have a purely mechanical locking function which is independent of the electronic system of the RFID transponder. Due to the arrangement of the RFID transponder in a plastic housing, a radio communication can take place with an associated reading device substantially without interference. At the same time, the RFID transponder is reliably protected against damage and contamination. This is an important aspect in the use of the padlock as a lockout lock since the padlock can be exposed to great strain by blows and/or wear if it is arranged at a switch of an industrial plant and is also taken along by the service engineer (for example hanging on a belt) when not in use.

The arrangement of the RFID transponder in the lock housing can take place in a variety of manners. The lock housing can, for example, form an outer cover into which the RFID transponder is integrated, in particular by overcasting or overmolding. It is alternatively possible, for example, to receive the RFID transponder releasably in the lock housing as will be explained in the following.

An RFID transponder is a receiver and transmitter device which receives an interrogation signal at a predetermined radio frequency and hereupon transmits a predetermined identification signal (for example an identification number encoded in a radio signal). This process is called RFID (radio frequency identification). For this purpose, the RFID transponder has at least one antenna, an electronic circuit coupled hereto and a non-volatile memory in which the predetermined identification number is stored. If an associated reading device generates an electromagnetic alternating field with a suitable frequency and transmits it to the RFID transponder (interrogation signal), the antenna of the RFID transponder takes on the electromagnetic energy of the alternating field, whereby the transmission of the named identification signal is triggered (in turn via the antenna). For this purpose, the electronic circuit of the RFID transponder does not have to have any energy supply of its own, but can rather take the required electric energy from the received alternating field. The output identification signal is imprinted into the alternating field generated by the reading device by field attenuation such that the reading device can decode the identification signal of the RFID transponder. Such an RFID transponder is known, for example, from the document U.S. Pat. No. 7,205,899.

It can be found and/or documented in a simple manner by the reading of the identification signal of an RFID transponder combined with a lockout lock which lockout lock (corresponding to a specific service engineer) is or was fastened to a switch of an industrial plant at a given time. It is also possible in this respect simultaneously to detect a plurality of RFID transponders by means of a single associated reading device, i.e. the presence of a plurality of different RFID transponders or lockout locks can simultaneously be determined and/or documented. A control device associated with the switch or with the respective industrial plant can additionally be supplied with monitoring signals (redundant possibility of monitoring the switch state) on the basis of the information obtained by means of the reading device (e.g. identification number and date/time). Which lockout locks were arranged at the respective switch of the industrial plant at which time can alternatively or additionally be documented, for example for the case of an industrial accident (accident clarification, liability).

In accordance with an advantageous embodiment, the RFID transponder is enclosed on all sides within the lock housing. A particularly effective protection of the RFID transponder from mechanical damage and/or contamination is hereby ensured. The surrounding of the RFID transponder at all sides preferably takes place by cooperation of the lock housing with a further part of the padlock, in particular having a further housing part (e.g. inner housing or outer housing part).

In accordance with a further embodiment, the lock cylinder of the padlock has a longitudinal shape with a longitudinal axis which typically corresponds to the axis of rotation of a rotatable cylinder core of the lock cylinder. The lock cylinder can be configured, for example, as a profile cylinder, in particular as a replaceable profile cylinder. The RFID transponder is arched with respect to the longitudinal axis of the lock cylinder in this embodiment. In other words, the RFID transponder extends in curved shape about the lock cylinder in cross-section (in a normal plane to the longitudinal axis). A particularly advantageous angular characteristic of the RFID transponder hereby results, i.e. the RFID transponder can cooperate with an associated reading device in a large angular range. A reliable communication with an associated RFID reading device can in particular hereby be achieved irrespective of whether the front side or the rear side of the padlock faces the RFID reading device. The lock cylinder, which is typically made from metal, in this respect does not prove to be a disturbance since the lock cylinder can be arranged within the arch formed by the RFID transponder, i.e. the RFID transponder can peripherally surround the lock cylinder completely or partly.

The RFID transponder can in particular extend along at least a part of the length of the lock cylinder and along at least a part of the periphery of the lock cylinder. In this respect, the RFID transponder does not have to contact the lock cylinder, but is rather preferably arranged spaced apart from it (in the radial direction with respect to the longitudinal axis of the lock cylinder). A particularly good reception and transmission characteristic of the RFID transponder is hereby achieved, whereas the accommodation of the RFID transponder in the lock housing can be realized in the manner of a unit "wound" around the lock cylinder in a simple construction manner and with minimal space requirements.

It is of advantage if the RFID transponder is arranged spaced apart from the lock cylinder. Investigations have shown that a particularly good angular characteristic of the RFID transponder is achieved when the RFID transponder does not directly contact the lock cylinder, but is rather arranged at a specific spacing from the lock cylinder. This in particular applies when the RFID transponder is arched with respect to the longitudinal axis of the lock cylinder, as explained above.

If the padlock has a further housing part in addition to the lock housing, said further housing part can be secured in or at the lock housing (for example received therein), with the RFID transponder being arranged in an intermediate space between the lock housing and the further housing part. This allows a particularly simple and fast fastening of the RFID transponder in the lock housing since the RFID transponder only has to be placed into the lock housing or into the further housing part before the lock housing and the housing part are secured to one another and the RFID transponder is thus captured in the lock housing. Furthermore, an advantageous spacing between the RFID transponder and the lock cylinder can hereby be realized in a simple manner.

The RFID transponder can in particular be received in form-fitted manner in a cut-out of the lock housing or of the further housing part provided for this purpose to ensure a substantially clearance-free seating of the RFID transponder in the lock housing.

It is preferred with respect to the named further housing part if it is also made from plastic. A large range and a wide angular characteristic of the RFID transponder is hereby supported even better. It is, however, also possible to produce the named housing part from metal, provided that an electric insulation from the components of the RFID transponder is ensured (for example by a plastic enveloping of the RFID transponder).

In accordance with a preferred embodiment, the lock housing and the named further housing part are secured to one another by means of a releasable securing device (for example by means of a screw), with the RFID transponder being captured between the lock housing and the housing part as long as the lock housing and the housing part are secured to one another by means of the named securing device. The RFID transponder is hereby captively secured in a reliable manner in the lock housing. The RFID transponder can nevertheless subsequently be replaced, for example to allocate a different identification number to the respective lockout lock.

It is in this respect particularly advantageous if the named securing device is only accessible when the authorized user has brought the lock cylinder into the open position by means of an associated key. It is hereby possible for the authorized user to replace the RFID transponder as required. However, as long as the lock housing and the housing part are secured to one another by means of the named securing device and the padlock is locked, the RFID transponder is captured in an unreachable manner between the lock housing and the housing part so that a high manipulation security is ensured with respect to the association of a predetermined RFID transponder with the respective padlock.

It is preferred with respect to the RFID transponder if it has two antennas. The sensitivity and the angular characteristic of the RFID transponder can hereby be even further improved.

The above-named object is also satisfied by a securing and monitoring system for a switch of an industrial plant which includes at least one padlock having a lock housing made of plastic and having an RFID transponder arranged in the lock housing, wherein the padlock can be fastened to the switch of the industrial plant, with the securing and monitoring system furthermore having a reference RFID transponder which is permanently fastened in the environment of the switch and having a mobile RFID reading device which is configured to read out the RFID transponder of the padlock and the reference RFID transponder fastened in the environment of the switch.

It is possible by such a securing and monitoring system, on the one hand, to detect the presence of a lockout lock by means of the RFID reading device, namely in that the RFID transponder of the lockout lock is detected. On the other hand, a spatial association of the lockout lock with the respective switch of the industrial plant can be established in that the RFID reading device simultaneously detects the reference RFID transponder mounted in the vicinity of the switch. The presence of a specific lockout lock at the switch can thus be reliably and reproducibly detected by mans of an RFID reading device, whereby a conclusion can be drawn that the corresponding service engineer has attached his lockout lock properly to the switch.

The named RFID reading device can in particular be configured to store a piece of identification information read out of the RFID transponder of the lockout lock and a piece of identification information read out of the reference RFID transponder together with a piece of time information (date/time), in particular in a non-volatile memory. The associated time information can, for example, be derived from an integrated clock of the RFID reading device.

The above-named object is also satisfied by a securing and monitoring system for a switch of an industrial plant which has at least one padlock having a lock housing made of plastic and having an RFID transponder arranged in the lock housing, wherein the padlock can be fastened to the switch of the industrial plant, and wherein the securing and monitoring system has an RFID reading device which is permanently fastened in the environment of the switch and which is configured to read out the RFID transponder of the padlock at predetermined times.

In this embodiment, the need to bring the mobile RFID reading device into the proximity of the switch at predetermined times to detect any lockout locks or their RFID transponders which may be present. Instead, an RFID reading device mounted permanently in the proximity of the switch can detect the presence of one or more lockout locks at the switch by an automatic check at regular time intervals.

The permanently fastened RFID reading device can in particular be configured to store a piece of identification information read out of the RFID transponder of the lockout lock together with a piece of time information, in particular in a non-volatile memory. A particularly reliable and complete documentation is hereby possible on which lockout locks were located at the switch at which times.

Alternatively or additionally, the piece of information read out of the RFID transponder of the lockout lock can be transmitted to a central storage and/or evaluation device. The central storage and/or evaluation device can in this respect receive the signals from a plurality of stationary RFID reading devices which are associated with different switches of the industrial plant.

In another respect, in the above-explained securing and monitoring systems, the respective padlock can be further developed in accordance with one of the embodiments which were likewise explained above for a lockout lock in accordance with the invention.

BRIEF DESCRIPTION OF THE DRAWINGS

The invention will be explained in the following only by way of example with reference to the drawings. Elements which are the same or of the same kind are marked by the same reference numerals therein.

DETAILED DESCRIPTION OF THE PREFERRED EMBODIMENTS

Figure 1:
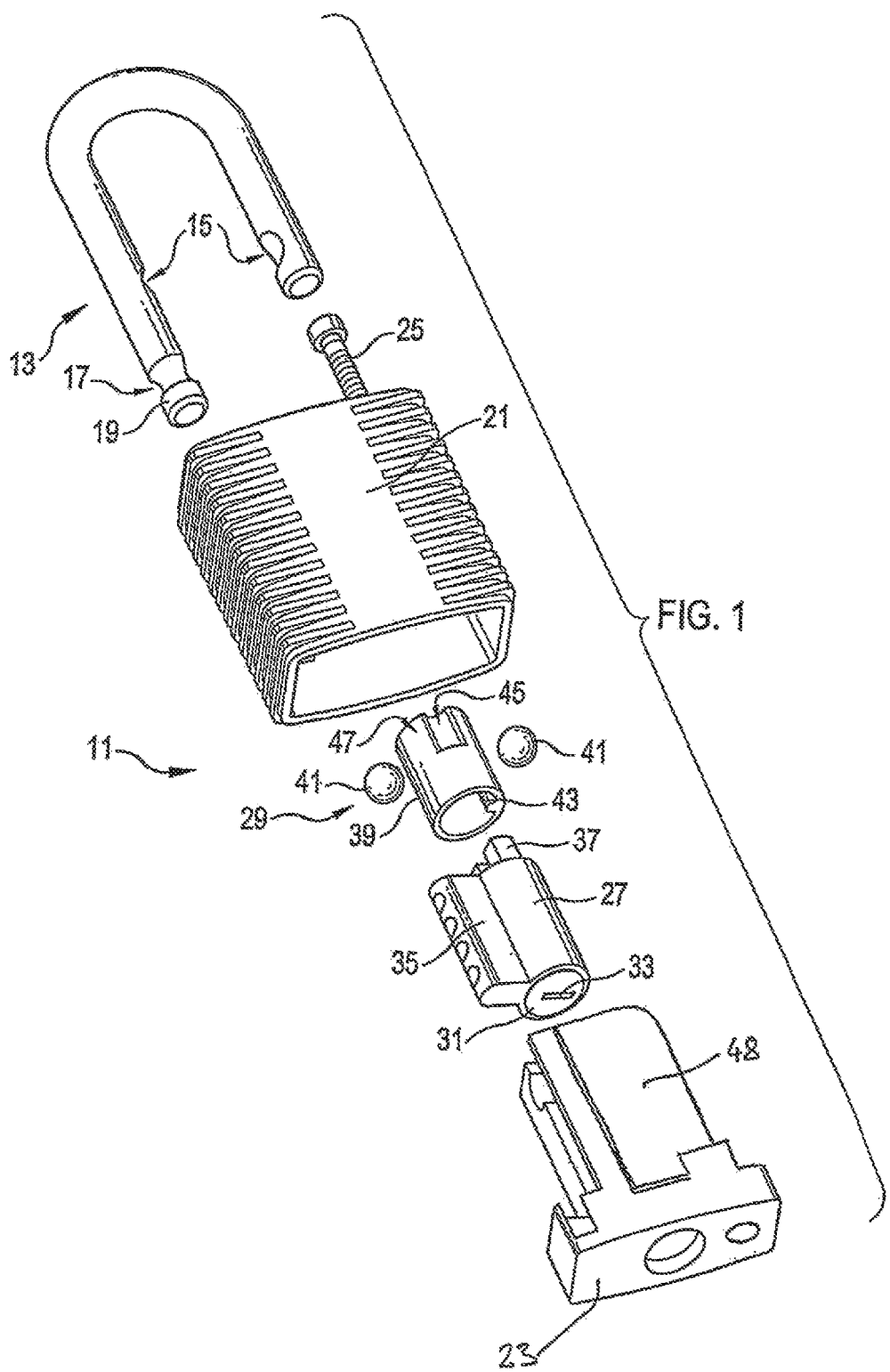
FIG. 1 shows a padlock in an exploded view.

The padlock shown in FIG. 1 has a lock body 11 and a hoop 13. The hoop 13 has a U shape with one shorter limb and one longer limb. An inwardly facing locking recess 15 is formed at both limbs of the hoop 13. Furthermore, a ring groove 17 with an abutment head 19 adjacent to it is provided at the free end of the longer limb.

The lock body 11 has a lock housing 21 and a further housing part which is configured as an inner housing 23 in the embodiment shown. The lock housing 21 and the inner housing 23 comprise plastic. The inner housing 23 can be inserted into the lock housing 21 and can be fixed to the lock housing 21 by means of a securing screw 25, as will be explained in the following. The lock housing 21 and the inner housing 23 accommodate a lock cylinder 27 and a locking mechanism 29 via which the lock cylinder 27 cooperates with the hoop 13.

The lock cylinder 27 has a cylinder core 31 having a keyway 33. The cylinder core 31 is rotatably mounted within a cylinder housing 35 with respect to an axis of rotation A (FIG. 2), wherein a rotary actuation is only possible when an associated key is introduced into the keyway 33. The cylinder core 31 has a driver projection 37 at the rear side.

The locking mechanism 29 includes a rotational bolt 39 and two blocking balls 41. The rotational bolt 39 has a substantially hollow cylindrical shape with an engagement projection 43 at the inner side which permits a rotationally fixed coupling to the driver projection 37 of the lock cylinder 27. The rotational bolt 39 has, at the outer side, two receiving recesses 45 which can partly accept the blocking balls 41 on an opening actuation of the lock cylinder 27 and thus of the rotating bolt 39. At the periphery, in each case adjacent to the receiving recesses 45, the rotational bolt 39 forms locking sections 47 by which the blocking balls 41 can be held in a blocking engagement with the locking recesses 15 of the hoop 13.

The padlock shown in FIG. 1 selectively allows by a corresponding actuation of the lock cylinder 17 the locking of the hoop 143 to the lock body 11 (locking position of the lock cylinder 27) or the release of the shorter limb of the hoop 13 from the lock body 11 (open position of the lock cylinder 27), for example to be able to introduce the hoop 13 into an eyelet or to remove it therefrom. The padlock shown is in particular suitable for use as a lockout lock.

In accordance with the invention, an RFID transponder is arranged within the lock housing 21 and is configured in the embodiment shown here as a flexible unit whose antenna and electronic components are received in a flexible film. The RFID transponder 48 is thus U-shaped in cross-section and arched with respect to the longitudinal axis of the lock cylinder 27 (axis of rotation A in accordance with FIG. 2). The RFID transponder is in this respect arranged radially spaced apart from the lock cylinder 27.

Figure 2:
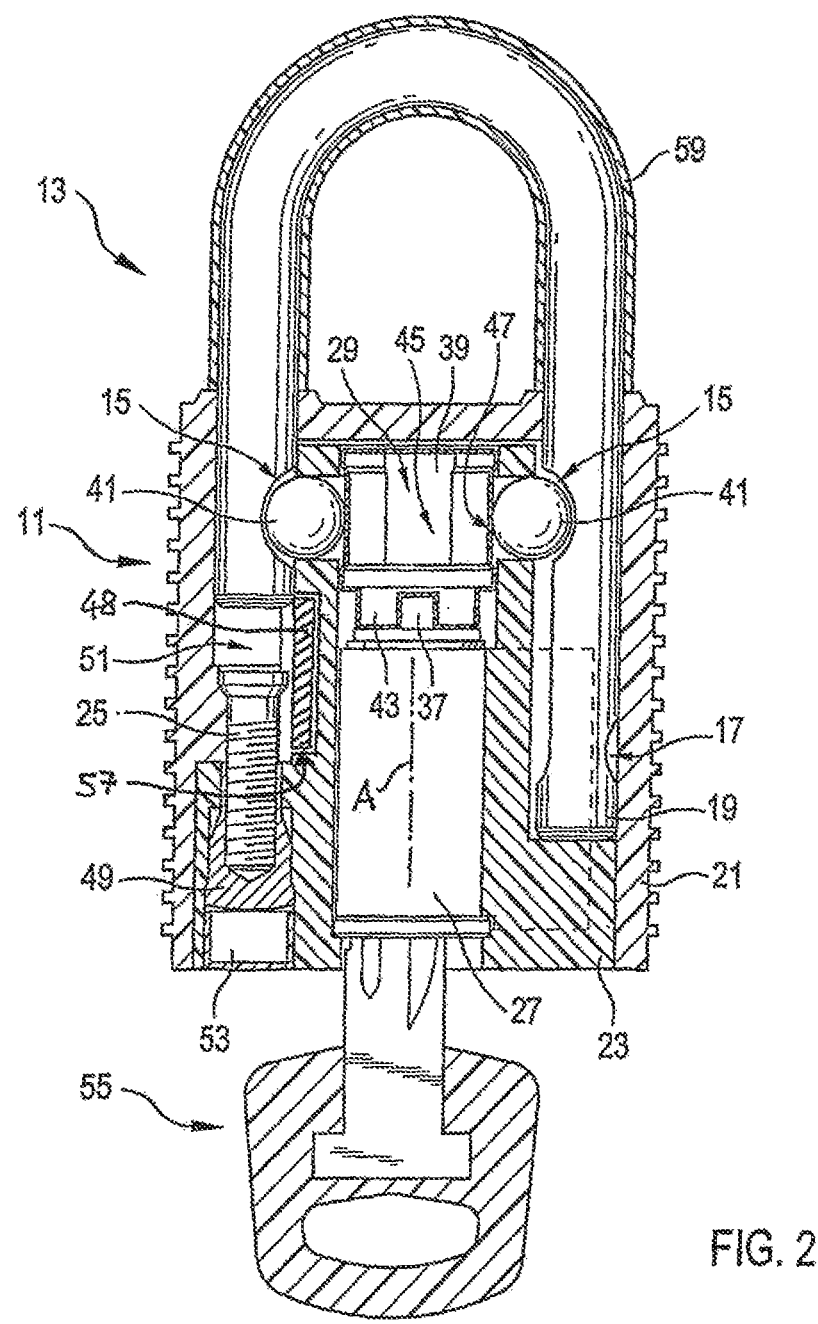
FIG. 2 shows a padlock in a cross-sectional view.

FIG. 2 shows a cross-sectional view of a possible embodiment of a padlock in accordance with FIG. 1 in a mounted state and with a locked hoop 13. The inner housing 23 is pushed into the lock housing 21 and is fixed to the lock housing 21 by means of the securing screw 25 for the installation of the padlock. The lock cylinder 27, the locking mechanism 29 and the RFID transponder 48 are thereby captured in the lock housing 21. The fastening screw 25 cooperates with a nut 49 rotationally fixedly inserted into the inner housing 23. The securing screw 25 is inserted into a hoop receiving passage 51 of the lock housing 21 which is closed by the hoop 13 when the hoop 13 is locked to the lock body 11—as shown in FIG. 2. The nut 49 is covered by means of a cover 53. Provided that the lock cylinder 27 has been brought into the open position and the shorter limb of the hoop 13 has been removed from the hoop receiving passage 51, the securing screw 25 can again be released from the nut 49 to remove the inner housing 23 from the lock housing 21. The RFID transponder 48 can hereby also be retroactively replaced.

To fix the securing screw 25 permanently or to make a subsequent opening of the lock housing 21 and any replacement of the RFID transponder 48 recognizable, the securing screw 25 in the respective hoop receiving passage 51 can be provided with a lacquer film or with an adhesive, for example with Loctite (registered trademark of Henkel Corporation, USA).

FIG. 2 shows a state of the padlock in which the hoop 13 is locked and is thus secured against removal from the lock body 11. The locking sections 47 of the rotational bolt 39 hold the blocking balls 41 in blocking engagement with the locking recesses 15 of the hoop 13 for this purpose. To unlock the padlock, a rotational opening actuation by means of an associated key 55 is required. The driver projection 37 of the lock cylinder 27 and the rotational bolt 39 are hereby rotated by 90° so that a respective receiving recess 45 of the rotational bolt 39 is rotated into the region of the blocking balls 41. The blocking balls 41 can thus move back out of the locking recesses 15 of the hoop 13. The hoop 13 can now be pulled out of the lock body 11 axially until the abutment head 19 of the longer hoop limb abuts the respective blocking ball 41. The shorter limb of the hoop 13 now already projects out of the lock body 11. The hoop 13 can now be rotated about the longitudinal axis of the longer hoop limb. A repeated locking of the hoop 13 to the lock body 11 takes place in the reverse order.

The cross-sectional view in accordance with FIG. 2 allows it to be recognized that the RFID transponder 48 is received in a recess 57 of the inner housing 23.

Figure 3:
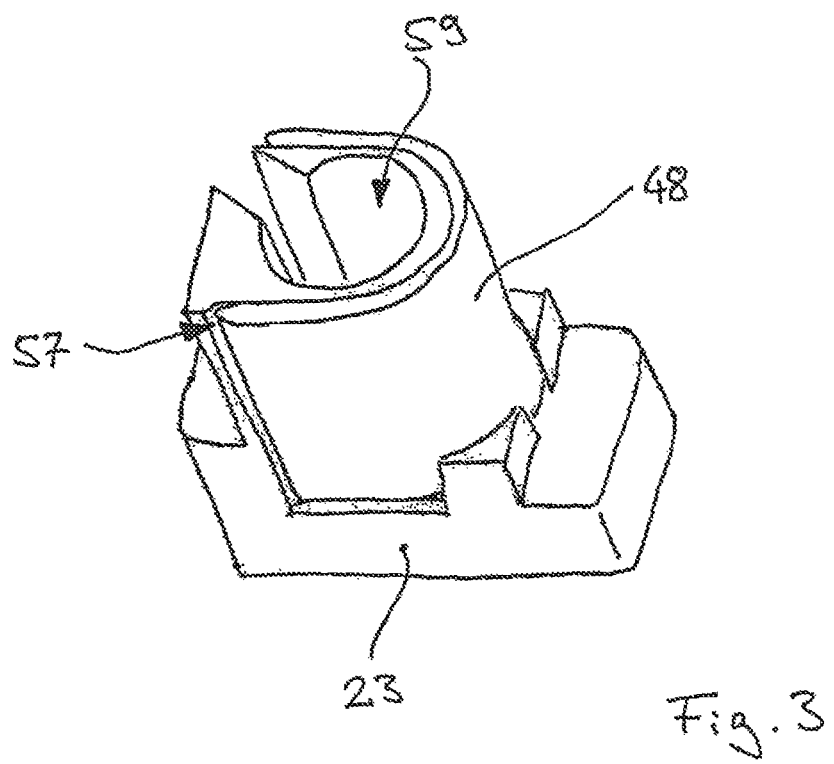
FIG. 3 shows an inner housing with an RFID transponder in a perspective view.

FIG. 3 shows a perspective view of a possible embodiment of an inner housing 23 of the padlock in accordance with FIG. 1 or FIG. 2. The RFID transponder 48 is shown which is curved in U shape and which is inserted into an outer recess 57 of the inner housing 23 in form-fitted manner. In this respect, the RFID transponder 48 surrounds at a specific radial spacing a central recess 59 of the inner housing 23 which is provided for the form-fitted reception of a lock cylinder 27 in the assembled state of the padlock. It can be recognized in FIG. 3 that the RFID transponder then extends—viewed in a radial projection with respect to the axis of rotation A in accordance with FIG. 2—along a part of the length of the lock cylinder 27 and along a part of the periphery of the lock cylinder 27.

Since the respective padlock in accordance with FIGS. 1 and 2 is provided with an RFID transponder 48, a piece of identification information can, as required, be read out of the RFID transponder 48 by means of an associated RFID reading device, said piece of identification information allowing a reliable identification and localization of the respective padlock. The padlock is hereby particularly well suited for use as a lockout lock for securing an electric switch or other switch of an industrial plant. On the one hand, a switch position can namely be blocked by means of the locked hoop 13. On the other hand, it can be monitored and documented by reading out the piece of identification information stored in the padlock which padlock is or was arranged at the switch at which time. This will be explained in more detail in the following with reference to two possible embodiments.

Figure 4:
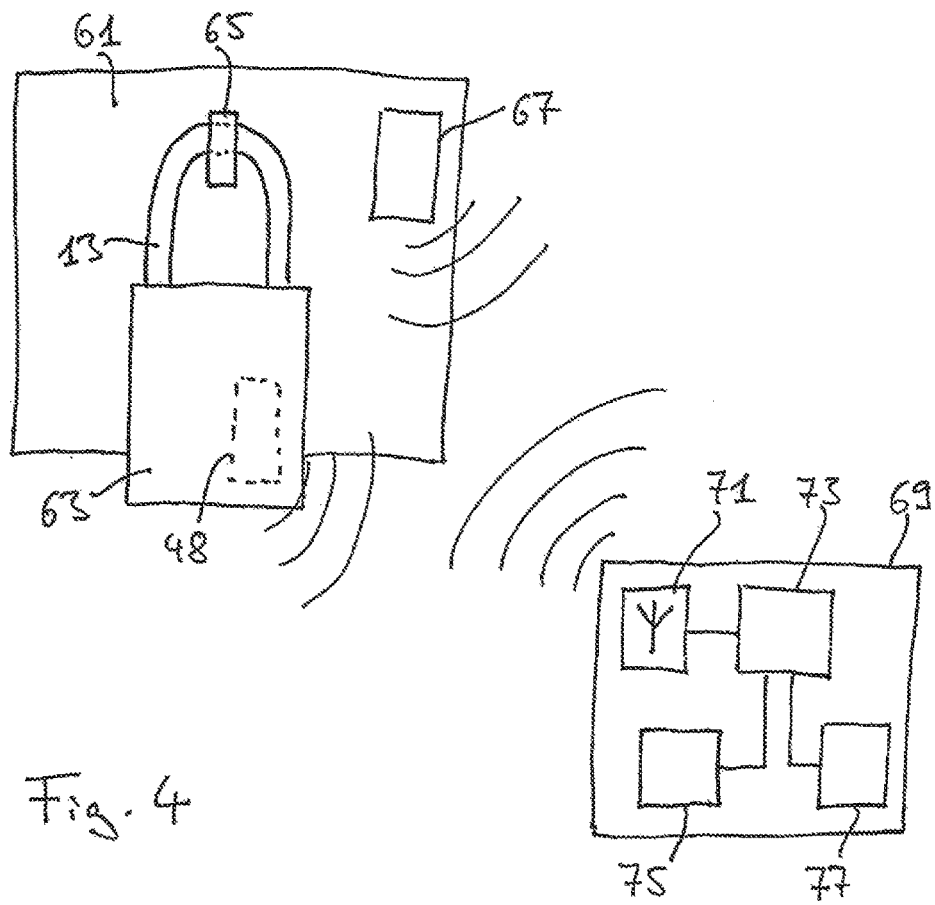
FIG. 4 shows a schematic representation of a securing and monitoring system for a switch of an industrial plant.

FIG. 4 shows a securing and monitoring system for a switch 61 of an industrial plant. This securing and monitoring system includes a padlock 63 whose hoop 13 is hung into a blocking device 65 of the switch 61, for example into an eyelet. The padlock 63 has an RFID transponder 48, as explained in connection with FIGS. 1 to 3.

The securing and monitoring system in accordance with FIG. 4 furthermore includes a reference RFID transponder 67 permanently mounted at the switch 61 or in the proximity of the switch 61. The securing and monitoring system furthermore includes a mobile RFID reading device 69. It has a transmission and reception antenna 71, a control and evaluation circuit 73 coupled hereto, a non-volatile memory 75 and an energy supply device 77 (e.g. an electric battery).

An interrogation signal can be transmitted by means of the RFID reading device 69, said interrogation signal being an electromagnetic alternating field of a predetermined frequency. In response to this interrogation signal, both the RFID transponder 48 of the padlock 63 and the reference RFID transponder 67 output a respective identification signal which includes a piece of individual identification information for the respective RFID transponder 48 and 67 respectively. The respective identification signal can be received and decoded by the mobile RFID reading device 69. The respective received and decoded piece of identification information is stored in the non-volatile memory 75, preferably together with a piece of associated time information.

The switch 61 can thus be monitored by means of the mobile RFID reading device 69 as to whether the padlock 63 having the RFID transponder 48 (and/or another padlock) is also detected at a time at which the RFID reading device has identified the reference RFID transponder 67. The securing state of the switch 61 can be documented by a regular or continuous writing of this evaluation result into the non-volatile memory 75, for example for the case of a disturbance or of an accident.

Figure 5:
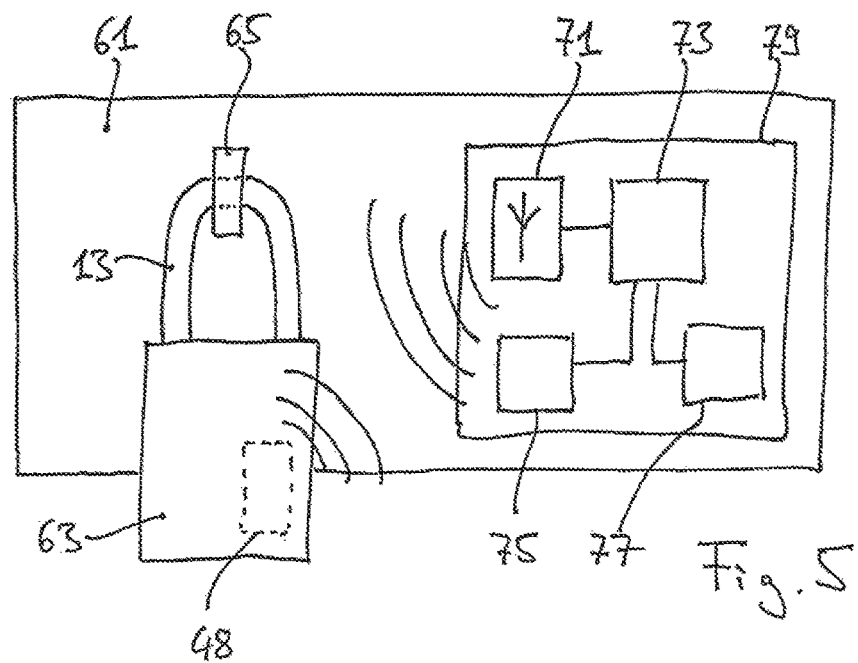
FIG. 5 shows a further securing and monitoring system in a schematic representation.

FIG. 5 shows an embodiment of a securing and monitoring system for a switch 61 of an industrial plant modified with respect to FIG. 4. This securing and monitoring system also includes a padlock 63 having an RFID transponder 48, as explained in connection with FIGS. 1 to 3. The hoop 13 of the padlock 63 is hung into a blocking device 65 of the switch 61. Unlike the embodiment in accordance with FIG. 4, a stationary RFID reading device is arranged at the switch 61 or in the vicinity of the switch 61, i.e. the RFID reading device 79 is permanently fastened to the switch 61 or in the vicinity of the switch 61 for its operation.

An interrogation signal which is converted in the RFID transponder 48 of the padlock 63 into an identification signal can be automatically triggered by means of the stationary RFID reading device 79. This identification signal characteristic for the RFID transponder 48 and thus for the padlock 63 can be received and decoded by the stationary RFID reading device 79. The piece of identification information acquired from this is then stored in a non-volatile memory 75 of the stationary RFID reading device 79, preferably together with a piece of time information. The securing state of the switch 61 is thus monitored so that a check can be made by reading out the non-volatile memory 75 which padlock has been arranged at the switch 61 or was arranged thereat at an earlier time.

It must still be noted with respect to the explained embodiments that, instead of the shown lock housing 21 and inner housing 23 (FIGS. 1 and 2), for example a multipart outer lock housing of plastic can be provided, in particular in the manner of an open housing having an associated cover, or in the manner of a two-part lock housing having a central dividing plane as known from the initially named document U.S. Pat. No. 5,755,121. In the case of such a multipart lock housing of plastic, an inner housing can optionally additionally be provided.

Instead of a padlock having a U-shaped hoop, a padlock can, for example, also be used having a curved rotary hoop.

The invention claimed is:

1. A padlock for securing and monitoring a switch of an industrial plant, comprising:
    a lock housing of plastic;
    a housing part which is secured in or at the lock housing;
    a hoop which is displaceably held at the lock housing; and
    a lock cylinder which can selectively be brought from an open position into a locked position to lock the hoop to the lock housing;
    wherein an RFID transponder is arranged in an intermediate space between the lock housing and the housing part.

2. The padlock in accordance with claim 1, wherein the RFID transponder is received in a recess of the lock housing or of the housing part.

3. The padlock in accordance with claim 2, wherein the RFID transponder is received in the recess in a form-fitted manner.

4. The padlock in accordance with claim 1, further comprising a fastener which releasably secures the lock housing and the housing part to one another, wherein the RFID transponder is captured in the intermediate space while the lock housing and the housing part are secured to one another.

5. The padlock in accordance with claim 4, wherein the fastener is accessible from the outside only when the lock cylinder is brought into the open position by an associated key.

6. The padlock in accordance with claim 4, wherein the hoop comprises a limb which projects into a hoop receiving passage of the lock housing or of the housing part when the hoop is locked to the lock housing in the closed position of the lock cylinder, wherein the limb of the hoop can be removed from the hoop receiving passage only when the lock cylinder is in the open position, wherein the fastener is arranged at an end of the hoop receiving passage, and wherein the fastener is accessible from the outside only when the hoop is removed from the hoop receiving passage.

7. The padlock in accordance with claim 6, further comprising a locking mechanism via which the lock cylinder cooperates with the hoop to selectively lock or release the limb, wherein the lock cylinder comprises a rotatable cylinder core having a driver projection at a rear side, wherein the locking mechanism comprises a rotational bolt and two blocking balls, wherein the rotational bolt is rotationally fixed to the driver projection, and wherein the rotational bolt at an outer side has receiving recesses which can partly receive the blocking balls and locking sections by which the blocking balls can be held in a blocking engagement with the hoop.

8. The padlock in accordance with claim 1, wherein the housing part forms an inner housing which can be inserted into the lock housing.

9. The padlock in accordance with claim 1, wherein the housing part is formed of plastic.

10. The padlock in accordance with claim 1, wherein the RFID transponder is arranged spaced apart from the lock cylinder, and wherein the RFID transponder is completely surrounded by at least one of the lock housing and the housing part.

11. The padlock in accordance with claim 1, wherein the lock cylinder has a longitudinal shape having a longitudinal axis, wherein the RFID transponder is arched with respect to the longitudinal axis of the lock cylinder.

12. The padlock in accordance with claim 1, wherein the lock cylinder has a longitudinal shape having a longitudinal axis, wherein the RFID transponder extends at least along a part of the length of the lock cylinder along the longitudinal axis and at least along a part of the periphery of the lock cylinder around the longitudinal axis.

13. The padlock in accordance with claim 1, wherein the RFID transponder comprises at least one antenna, an electronic circuit coupled to the at least one antenna and a non-volatile memory in which a predetermined identification number is stored, wherein the RFID transponder is a passive component without an integrated energy supply.

14. A padlock for securing and monitoring a switch of an industrial plant, comprising:
    a lock housing of plastic;
    a hoop which is displaceably held at the lock housing;
    a lock cylinder which can selectively be brought from an open position into a locked position to lock the hoop to the lock housing; and
    an RFID transponder which is releasably received within the lock housing;
    wherein the RFID transponder is accessible for replacement only when the lock cylinder is brought into the open position by an associated key and the lock housing is opened.

15. The padlock in accordance with claim 14, further comprising a fastener for securing the lock housing in a closed state, wherein the hoop comprises a limb which projects into a hoop receiving passage of the lock housing when the hoop is locked to the lock housing in the closed position of the lock cylinder, wherein the limb of the hoop can be removed from the hoop receiving passage only when the lock cylinder is in the open position, wherein the fastener is arranged at an end of the hoop receiving passage, and wherein the fastener is accessible from the outside to selectively open the lock housing only when the hoop is removed from the hoop receiving passage.

16. The padlock in accordance with claim 15, further comprising a housing part which is selectively secured at the lock housing by the fastener to close or open the lock housing, wherein the RFID transponder is arranged in an intermediate space between the lock housing and the housing part.

17. The padlock in accordance with claim 15, further comprising a locking mechanism via which the lock cylinder cooperates with the hoop to selectively lock or release the limb, wherein the lock cylinder comprises a rotatable cylinder core having a driver projection at a rear side, wherein the locking mechanism comprises a rotational bolt and two blocking balls, wherein the rotational bolt is rotationally fixed to the driver projection, and wherein the rotational bolt at an outer side has receiving recesses which can partly receive the blocking balls and locking sections by which the blocking balls can be held in a blocking engagement with the hoop.

18. The padlock in accordance with claim 14, wherein the lock cylinder has a longitudinal shape having a longitudinal axis, wherein the RFID transponder extends at least along a part of the length of the lock cylinder along the longitudinal axis and at least along a part of the periphery of the lock cylinder around the longitudinal axis.

19. The padlock in accordance with claim 14, wherein the RFID transponder is arranged spaced apart from the lock cylinder.

20. The padlock in accordance with claim 14, wherein the RFID transponder comprises at least one antenna, an electronic circuit coupled to the at least one antenna and a non-volatile memory in which a predetermined identification number is stored, wherein the RFID transponder is a passive component without an integrated energy supply.

* * * * *